United States Patent [19]
Denison

[11] 4,126,848
[45] Nov. 21, 1978

[54] DRILL STRING TELEMETER SYSTEM

[75] Inventor: Early B. Denison, Houston, Tex.

[73] Assignee: Shell Oil Company, Houston, Tex.

[21] Appl. No.: 753,768

[22] Filed: Dec. 23, 1976

[51] Int. Cl.[2] .......................... G01V 1/40; E21B 23/00

[52] U.S. Cl. .......................... 340/18 LD; 340/18 CM; 166/206; 174/47

[58] Field of Search .................... 340/18 LD, 18 CM; 175/50; 174/47; 166/65 R; 324/10; 166/118, 206, 237, 239; 24/230

[56] References Cited

U.S. PATENT DOCUMENTS

| | | | |
|---|---|---|---|
| 2,339,274 | 1/1944 | Kothny | 166/65 |
| 3,664,416 | 5/1972 | Nicolas et al. | 166/65 R |
| 3,696,332 | 10/1972 | Dickson, Jr. et al. | 340/18 LD |
| 3,807,502 | 4/1974 | Heilhecker et al. | 340/18 LD |
| 3,957,118 | 5/1976 | Barry et al. | 340/18 LD |

*Primary Examiner*—Maynard R. Wilbur
*Assistant Examiner*—Lawrence Goodwin

[57] ABSTRACT

A method and apparatus for telemetering information from the bottom of a borehole to the surface while drilling wherein a wireline is used to transmit the information from the bottom of the borehole to an intermediate position in the drill string, and a special drilling string, having an insulated electrical conductor, is used to transmit the information from the intermediate position to the surface. In an alternate arrangement, an electro-magnetic method may be used to transmit information from the intermediate position to the surface. There is also disclosed special equipment that permits removal of the jumper wire from the surface without removing the drill string from the borehold.

15 Claims, 10 Drawing Figures

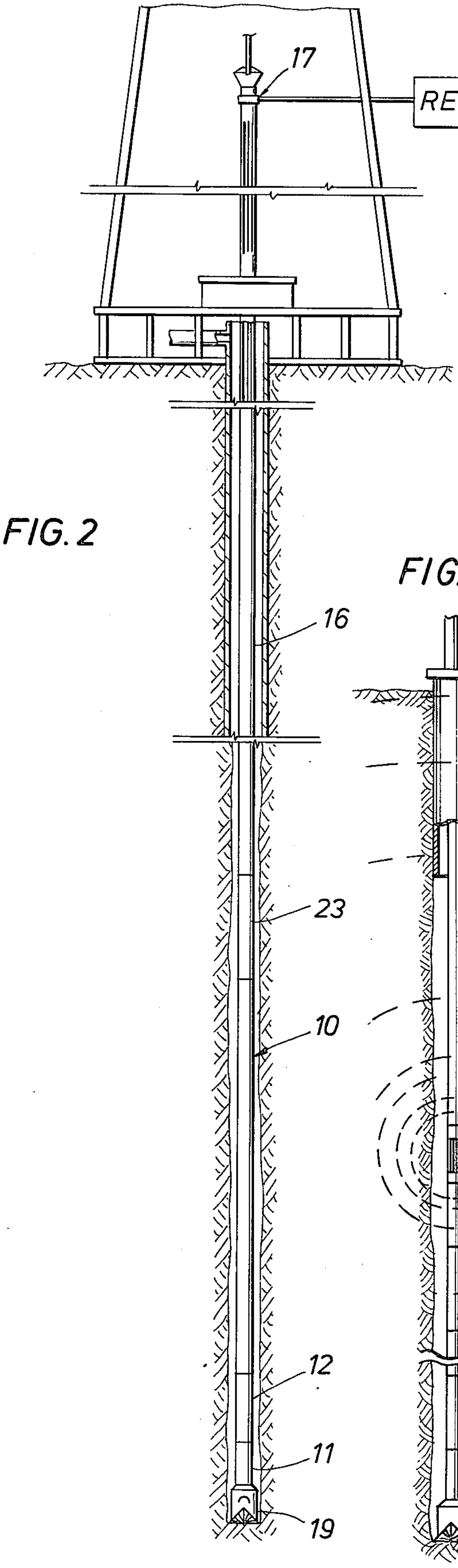
FIG. 2
FIG. 7
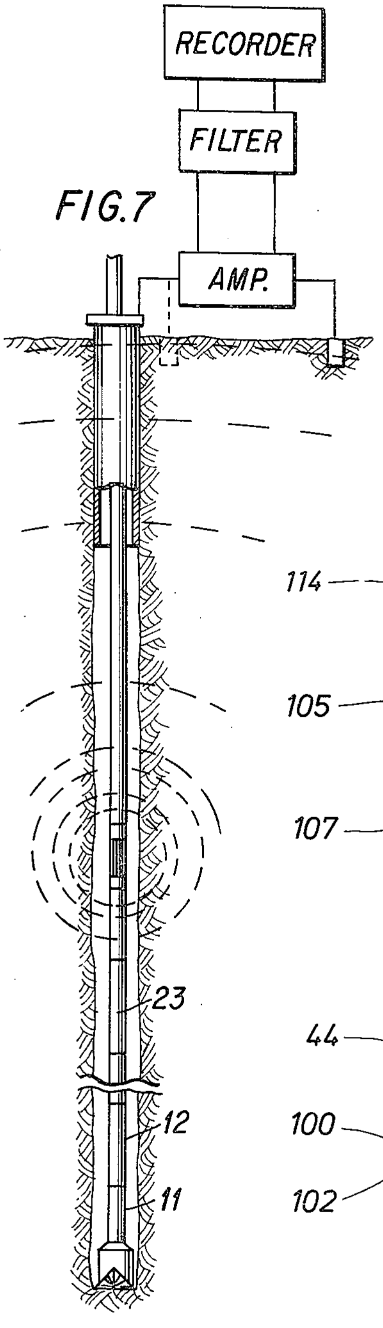
FIG. 6
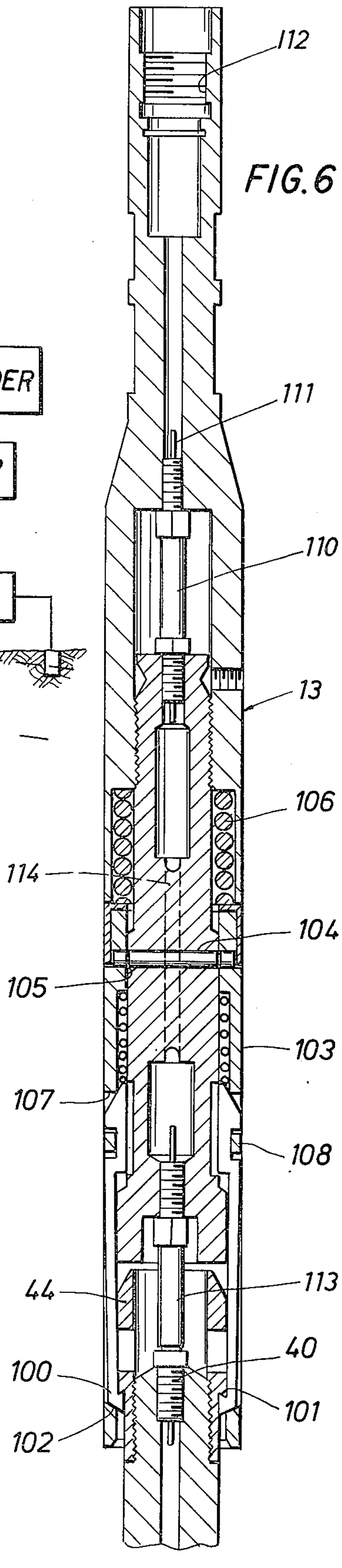

DRILL STRING TELEMETER SYSTEM

BACKGROUND OF THE INVENTION

The present invention relates to telemetering systems designed to transmit information from the bottom of a borehole to the surface while drilling a well. In the rotary drilling method, a string of pipe, having a drill bit at its lower end, is rotated to drill the well while circulating fluid down the drill pipe and up through the annular space between the drill pipe and the borehole. The circulating fluid is used to carry the drill bit cuttings to the surface and clean out the borehole. While the most common type of rotary drilling uses a drill rig to rotate the drill string, the invention may also be used when a mud turbine is used to rotate the drill bit.

One of the prior art systems used to telemeter information while drilling relies upon the production of pressure pulses in the mud stream to telemeter information to the surface. Additional systems, relying upon introduction of a wireline from the surface to the bottom of the borehole, have been used to transmit information to the surface. Likewise, various systems have been developed for installing the wireline in the drill string. For example in U.S. Pat. No. 3,696,332, there is disclosed a specialized drill string in which an insulated conductor is positioned in each section of the drill string and coupled to suitable ring-like connectors disposed in the sealing shoulders of each section of the drill string. In addition, the patent discloses using a single wireline to span a portion of the drill string, and the specialized drill string to complete the circuit between the end of the wireline and the surface of the well. This permits deepening the well while adding additional sections of the specialized drill string and still maintaining an electrical circuit to the bottom of the well. The advantage of using a wireline to span a portion of the drill string is a reduced cost since less of the specialized drill string and a reduced number of electrical connectors will be required.

While the above patent discloses a combination system, it relies on conventional wireline equipment for installing the continuous wireline in a portion of the drill string. While this is satisfactory, it is preferable to have specialized equipment for installing and removing the wireline. In particular, it is desireable to have a releasable connector on the bottom of the wireline for connecting the wireline to the bottom hole instrument package. In addition, some means is required for anchoring the top of the wireline so that it can be tensioned to avoid slack in the wireline. It is also desirable that the complete wireline and associated equipment be removable from the drill string to permit the introduction of additional wireline tools from the surface, or the use of fishing equipment to recover instruments introduced from the surface, or the use of fishing equipment to recover instruments introduced into the drill string. When the wireline is removed, the drill string should be clear of restrictions.

BRIEF SUMMARY OF THE INVENTION

The present invention solves the above problems by providing a releasable downhole connector for making an electrical connection between a wireline and a downhole instrument package. Further, the system includes an uphole anchoring means by which the wireline can be placed under tension and anchored in position. The downhole connector is released by removing the tension on the wireline. When the tension is removed, cam means in the connector operate to release the connector and allow withdrawal of the wireline assembly from the drill string. This permits the application of any desired amount of tension on the wireline that does not exceed the breaking strength of the wireline. In addition, the releasing of the tension before withdrawing the wireline assembly from the drill string eliminates the possibility of the connector rebounding in the drill string as is the case when the tension must be applied to release the connector from the downhole instrument package. While it is preferable to release the downhole connector before pulling the wireline from the drill string, it is also possible to use other types of connectors. The uphole anchoring means comprises a wireline fitting having fingers which are biased, normally to the collapse position, but which can be extended to engage a shoulder formed on a sub member. Provisions are made for varying the overall length of the wireline so the exact length of the wireline can be selected which will permit applying the desired tension when the fingers engage the shoulder on the sub. In addition, the uphole sub member can be provided with a ring-like connector in its sealing shoulder that will cooperate with the drill string, as disclosed in U.S. Pat. No. 3,696,332. This permits the use of specialized drill string to complete the electrical circuit.

BRIEF DESCRIPTION OF THE DRAWINGS

The present invention will be more easily understood from the following description when taken in conjunction with the attached drawings, in which:

FIG. 2 is an elevation view of a complete drill string showing the combination of a wireline and specialized drill string;

FIG. 6 is a vertical section of an alternate downhole connector; and

FIG. 7 is an elevation view of a complete drill string showing the use of a wireline and electromagnetic system for telemetering information.

PREFERRED EMBODIMENT

Figure 1:
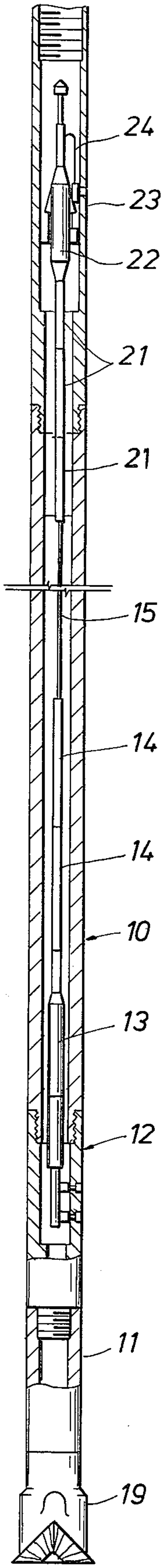
FIG. 1 shows a drill string with the downhole connector, wireline and uphole anchoring means installed therein.

Referring now to FIGS. 1 and 2, there is shown a representative drill string having the wireline installed in the bottom portion, and utilizing the specialized drill string of the above-referenced patent in the upper portion. In particular, FIG. 1 illustrates a drill string which comprises the heavy weight drill collars 10 positioned at the bottom of the drill string, and used for weighting the drill bit during rotary drilling operations. While only heavy-weight drill collars are shown, obviously this system could be used to span not only the drill collars but the major length of the drill pipe. The remainder of the drill string is completed by the specialized drill string 16, which has provisions for a slip ring arrangement 17 at its top. The slip rings are connected to the uphole electronics which are indicated as a receiver 18. The instrument package, or sub, is illustrated as 11 and may comprise various measuring devices. For example, devices may be utilized that detect the inflow of gas or other fluids into the well, as described in U.S. Pat. No. 3,776,032. Similarly, devices for measuring the resistivity of the formation, or the inclination and azimuth of the borehole may be included. The instrument sub is provided with conventional box and pin ends that may be connected to drill bit 19 at one end and connector sub 12 at the other. The downhole connector is disposed in a sub 12, which is provided with box, and pin ends that may be connected to the drill collars and instrument sub. The sealing shoulders of the instrument sub 11, and the downhole connecting sub 12, can be provided with circular contacts such as those described in U.S. Pat. No. 3,696,332. Electrical connection to the connecting sub is made by means of the releasable downhole connector 13 that is provided with a series of sinker bars 14 on its top. As will be explained below, the sinker bars are required to provide the weight required to operate the release mechanism of the connector. The sinker bars are connected to the wireline or armored cable 15, which is provided with additional spacing members 21 at its top. The spacing members 21 may be specially-designed sinker bars or short lengths of wireline which provide both an electrical circuit between the wireline and the uphole connector, and means for adjusting the overall length of the wireline. The spacer bars 21 are coupled to the uphole connector and cable terminal 22, which is positioned in the uphole connector sub 23. In addition, the uphole connector sub is provided with a box end that contains a ring-type contact for recoupling to the specialized drill string.

The wireline or armored cable is preferably a flexible steel cable having a single electrical conductor. This type of cable can easily be provided with threaded terminals at its ends. The terminals provide a means for forming both a physical and electrical connection with adjacent members. The sinker bars 14 have a central electrical conductor and threaded ends that mate with the terminals on the wireline. Similar sinker bars may be used for the spacers 21, although short lengths of wireline may be preferred.

In operation, the drill collars having the instrument and lower connector subs at the lower end are lowered into the borehole, and the uphole connector sub installed at its upper end. The wireline is then made up with the downhole connector 13, the downhole sinker bars 14 and suitable spacers 21, as required. The wireline can then be lowered into the drill collars and the downhole connector 13 latched on to the downhole connector sub 12. After the connection is made, the wireline can be tensioned until the fingers described above can be anchored in place on the uphole connector sub 23. If the wireline should prove too long to permit applying the proper tension, some of the spacing members 21 may be removed; while if it is too short, obviously additional ones can be installed Thus, it is possible to tailor the length of the wireline that will permit the application of the desired tension to anchor the uphole connector 22 in position. Finally, the electrical wire 24 is plugged into the uphole connector sub 23. After this is completed, the specialized drilling pipe described in the aforementioned patent can be used to complete the drill string 16, as shown in FIG. 2. The well can then be drilled while providing continuous telemetering of information from the downhole to the surface. While the system is described as using the wireline to bridge only the drill collars, obviously it will bridge as much of the drill pipe that extends into the borehole as desired. Normally, sufficient drill pipe will be lowered into the borehole to extend from the surface to near the bottom, and the wireline used to span this complete length. Only the top portion of the drill pipe will comprise the specialized drill pipe of the aforementioned patent.

Figure 3:
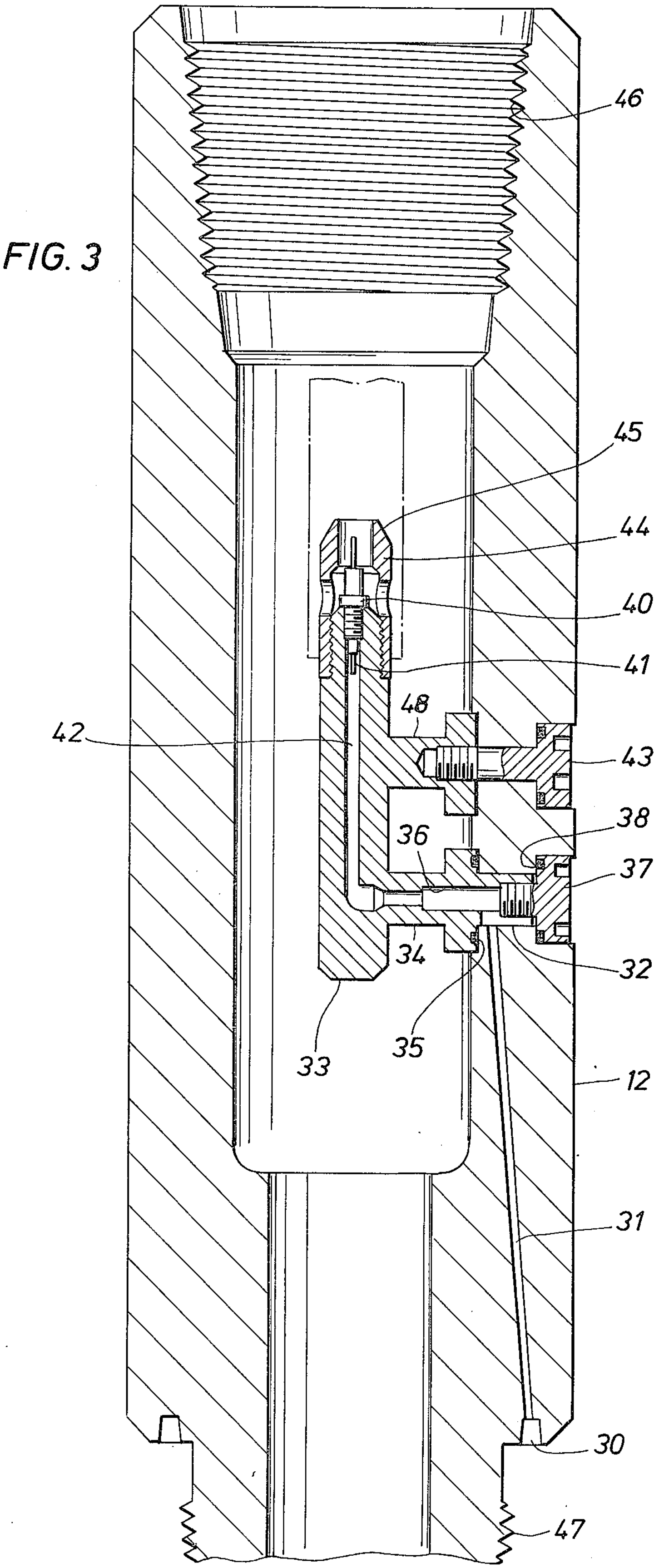
FIG. 3 is an enlarged view of the sub member used for the downhole connection.

Referring now to FIG. 3, there is shown an enlarged vertical section of the downhole connector sub 12. The connector sub 12 is provided with a pin end 47 and a box end 46 so that it may be coupled directly into the drill collars or drill strings, as required. In addition, the sealing shoulder of the pin end 47 is provided with an annular groove 30 in which a contact ring, such as that described in U.S. Pat. No. 3,696,332, may be installed. A passage 31 is formed in the sub so that the contact ring may be coupled by means of a wire to the male connector 40 disposed coaxially in the connector housing 33. The connector housing 33 is formed from a generally cylindrical vertical member, which is disposed coaxially with the instrument sub and two arms 34 and 48, which project at right angles. The length of the arms is adjusted so that when the housing is mounted in the instrument sub, the vertical portion will be coaxial with the connector sub. The housing is mounted in the sub by bolts 37 and 43 that thread into the two arms 34 and 48. The lower arm 34 is provided with a bore 36, which communicates with passage 31 to permit a wire to be installed to connect the conductor ring in annular groove 30 with the male connector 40. In addition, O-ring 35 is positioned in the arm to seal between the arm and the connector sub, while a similar O-ring is used to seal between the bolt 37 and the outer surface of the connector sub. A vertical passageway 42 is provided in the vertical portion of the housing so that the wire can be passed up and connected with the lower end 41 of the male connector 40. The downhole connector sub is completed by protection collar, or fishing neck 44, having a sloping top surface 45 to assist the releasable connector in centering itself over the male connector. The male connector 40 may be one-half of a Kemlon electrical connector made by Keystone Engineering Company of Houston, Texas. Kemlon connectors are used in the petroleum industry for coupling conventional wirelines to tools which are lowered into the borehole for running surveys.

Figure 4:
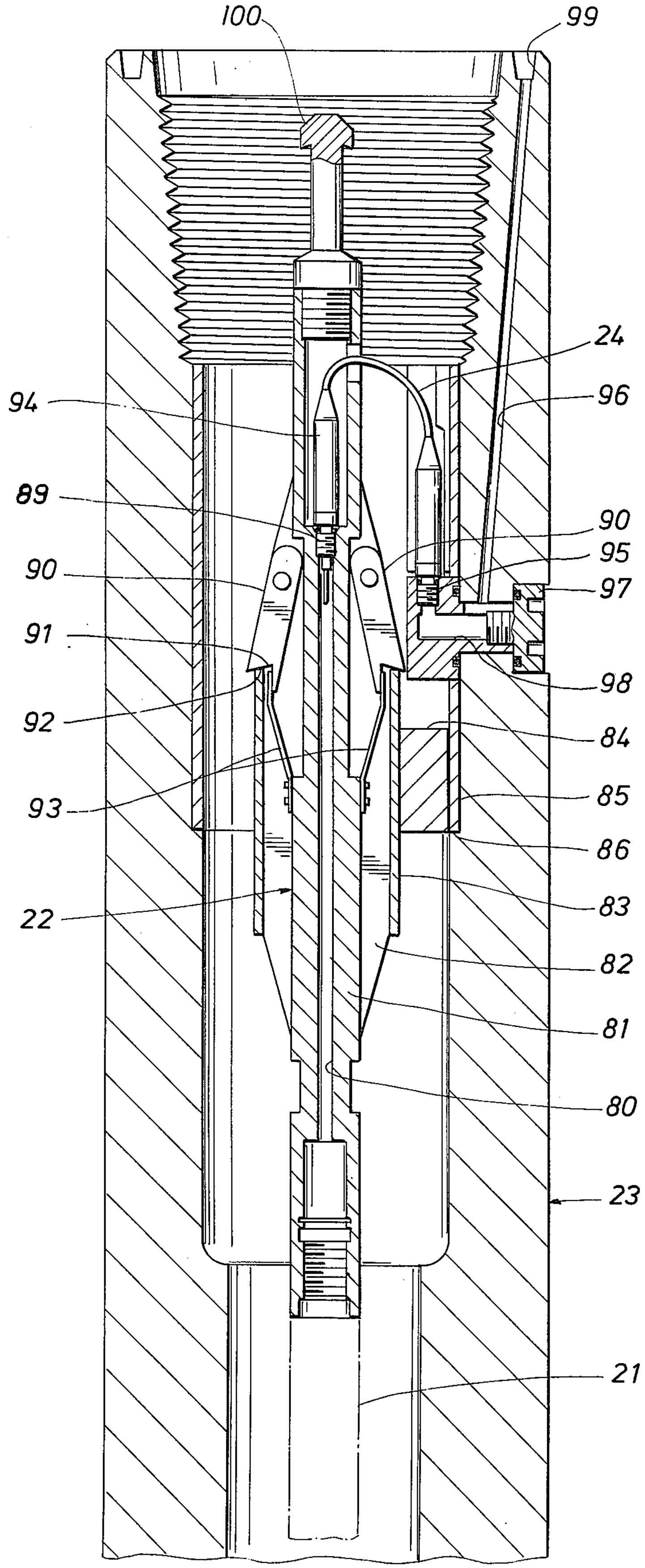
FIG. 4 is an enlarged view of the uphole anchoring means.

Referring now to FIG. 4, there is shown the uphole connector used to both anchor the upper end of the wireline and provide an electrical connection between the wireline and specialized drill pipe. As shown at the bottom of the figure, the spacing member 21 threads into the bottom of the connector 22. This provides a secure attachment between the upper end of the wireline and the connector so that a tension force can be applied to the connector to tension the wireline. The housing of the connector has a central member 81 that is provided with a central bore 80 so that a conductor may be used for coupling the wireline to one-half of a Kemlon connector 93 at the top. The central member is attached to a plurality of radial webs 82 which serve to center the central member in the cylindrical member 83. The cylindrical member 83 is in turn supported by webs 84 which join it to the outer cylindrical member 85 of connector housing. The cylindrical member may also be supported by a bolt arrangement, similar to that shown in FIG. 3, for supporting the downhole connector housing. The outer cylindrical member rests on a shoulder 86, formed in the upper connector sub 23.

A plurality, for example two pivoted fingers 90, is provided at the top of the connector housing 81. The fingers are provided at their lower end with a notched end 91 which engages the top edge 92 of the cylindrical member 83. The fingers are biased toward a retracted or inward position by a plurality of flat leaf springs 93. Thus, when the housing 81 is lifted, for example by attaching a suitable fishing tool to the fishing neck 100, the radial fingers 90 will be retracted, and the housing can be lowered through the central bore of the member 83. If desired, additional means may be used to positively force the fingers inwardly and reduce the possibility of the fingers being jammed in an extended position. This downward movement is required to release the downhole connector as described below. In a similar manner, the housing can be lifted to tension the wireline and a setting tool used to move the fingers into place to anchor the housing on the top of the member 83. The setting tool may comprise a simple tubular member that slides over the fishing neck 100, and forces the upper end of the fingers inwardly so that the notched end 91 engages the support members. The physical movement of the fingers will be relatively simple since the member is installed while the upper connector sub is on the level with the drill rig floor. The Kemlon connector 89 is coupled by a short cable 24 to a second Kemlon connector 95. A suitable passage 98 is formed in the wall of the member 23 so that a cable may be run from the second half of the Kemlon connector 95 through a passage 96 in the upper connector sub to an annular groove 99. The annular groove is provided with a ring connector, as used in the aforementioned patent. This provides a means by which the special drill string may be coupled directly to the upper connector sub and electrical contact formed between the conductors disposed in the sealing shoulders of the adjacent members.

Figure 5A:
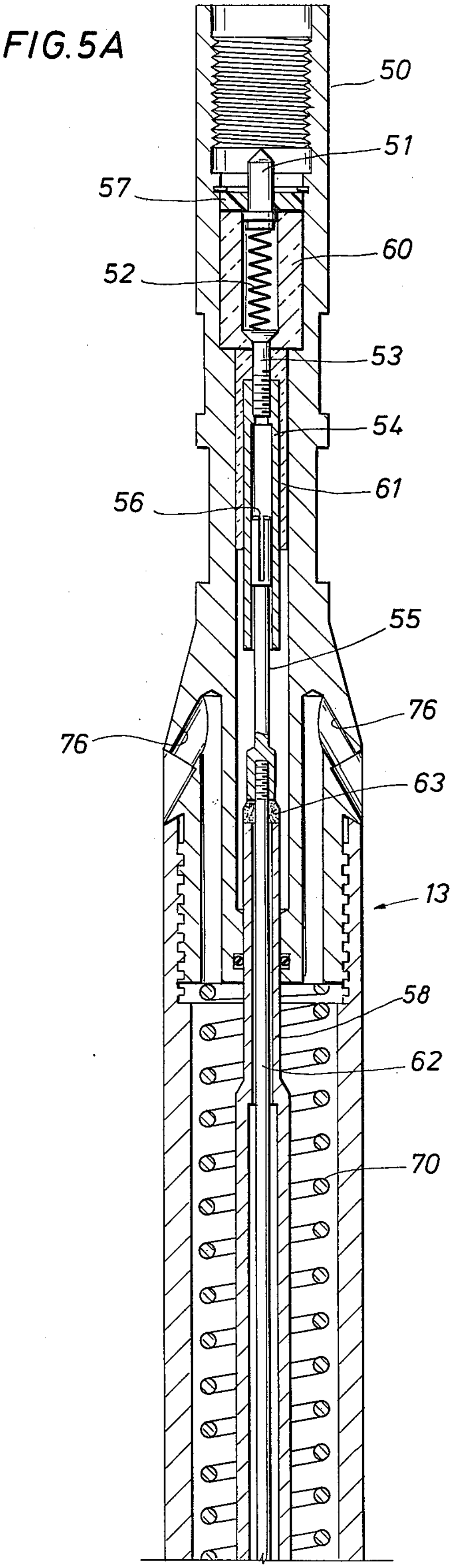
FIG. 5*a* and 5*b* are vertical sections of the releasable downhole connector.
Figure 5B:
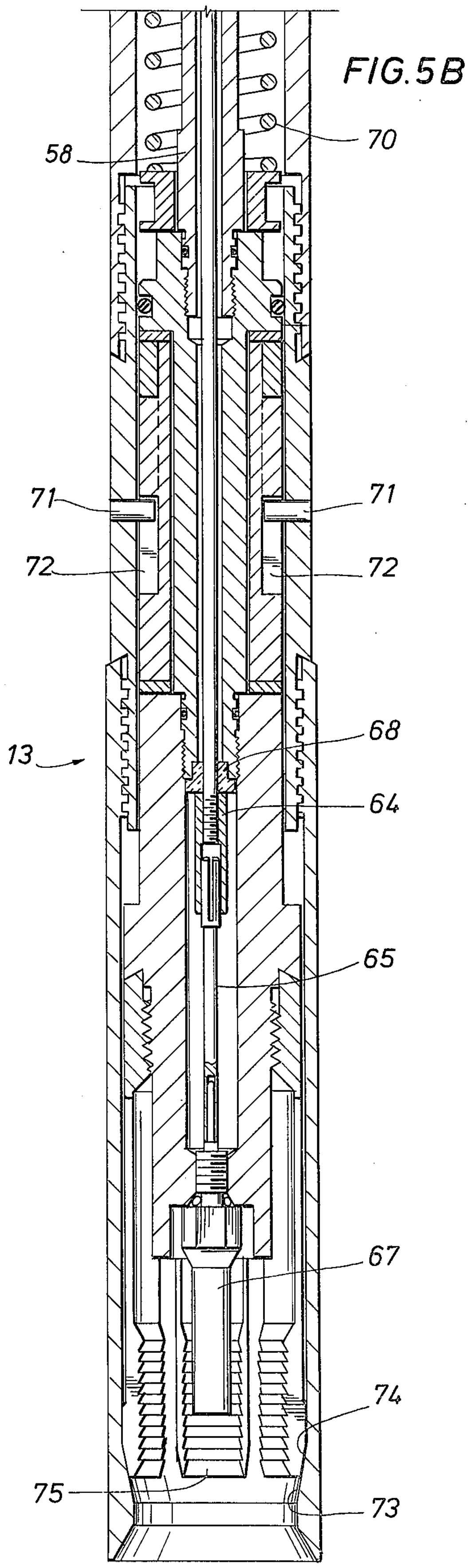

Referring now to FIGS. 5*a* and 5*b*, there is shown the construction of the downhole connector. The downhole connector is a modified wireline overshot tool manufactured by Taylor Made Oil Tools Company of 4430 Steffani Lane, Houston, Texas. The tool has been modified to permit a single electrical conductor to pass down the center with a female connector 67 at the lower end that connects with the male connector 40 of the downhole connector sub. The downhole connector is provided with an internally-threaded upper end 50 into which the sinker bars may be threaded to attach the wireline cable to the downhole connector. An electrical contact point 51 is biased upwardly by means of a spring 52 positioned in an insulated housing 60, and held in position by an insulated washer 57 and a snap ring. The spring 52 also provides an electrical connection between the contact 51 and the flathead screw 53. The flathead screw 53 threads into the top of the tubular conductor 54 that is positioned inside of an insulating sleeve 61. A rod-line conductor 55 slides within the tubular conductor 54, and is provided with longitudinal slots 56 in its upper end so that electrical contact is supplied by means of a solid rod 62, which extends through the remainder of the tool and is coupled to a second tubular conductor 64 at its lower end, shown in FIG. 5*b*. Suitable insulating washers 63 and 68 are provided for preventing the conductor rod 62 from shorting against the metallic housing of the connector. The outer surface of the rod 62 is insulated by a plastic coating. The circuit is completed by rod member 65, which fits into the tubular conductor 64, and connects with the female half 67 of the Kemlon electrical connector. A flexible electrical cable may be used in place of telescoping rod conductor described above. The cable may be connected to an extension of the tubular conductor 54 at the upper end, and to an extension of the tubular conductor 64 at the lower end. This will allow the elimination of the tubular member 58 from the assembly.

Figure 8A:
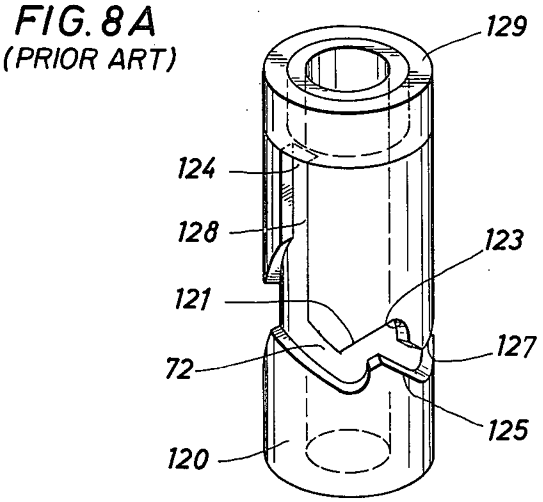
FIG. 8A (PRIOR ART)
FIG. 8*a* is a prospective view of the cam member shown in FIG. 5B
Figure 8B:
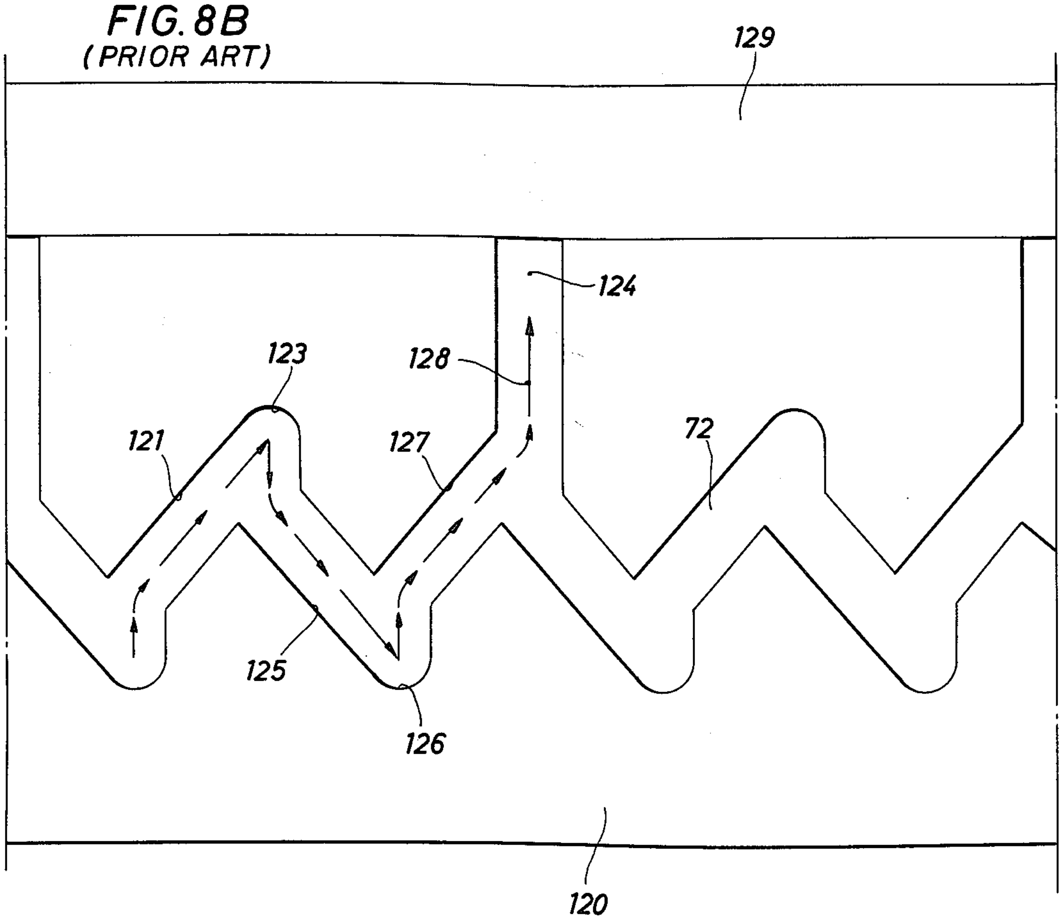
FIG. 8B (PRIOR ART)
FIG. 8*b* is a fold-out view of the surface 120.

The overshot tool is provided with a coil spring 70 which forces the collet fingers 75 downwardly. The downwardly force of the spring maintains the ramp surface 74 of the collets in contact with the ramp 73 of the outer actuator of the connector. An upward pull on the wireline, attached to the threaded end 50 of the connector, will pull the outer member up and the ramp surface will force the collet fingers to grab the fishing neck of the connector 44, shown in FIG. 3. When it is desired to release the connector, the tension on the wireline is removed to allow the sinker bars 14 to force the outer member down so that the collet fingers may move outwardly and release from the fishing neck. A suitable cam arrangement is provided so that on the succeeding upward pull, the outer member is prevented from moving upward with respect to the collet fingers and again forcing the collet fingers into a locking position. The cam arrangement is formed by a cam pin 71 and a cam slot 72 formed in the inner portion of the tool. The detailed construction of the cam is shown in FIGS. 8*a* and 8*b* of the drawing. The cam slot 72 is formed in a generally undulating shape on the outer surface 120 of the cam. The cam slot has four peaks, two of which 123 and 124 are shown with the peak 123 being lower than the peak 124. The peak 124 is formed by the ring 129 that closes the end of the vertical slot 128. As the cam pin 71 rides in the cam slot 72, it will ride up the ramp surface 121 when the outer actuator of the connector is pulled up by the tension on the wire line. The movement of the cam pin will be stopped when it engages the peak 123 of the cam slot. The peak 123 of the cam slot is positioned to limit the axial movement of the operating member to a position where the ramp surface 73 will not force the collet fingers inwardly to grip the corresponding portion of the companion connector on the downhole sub. Thus, in this position the connector can be removed from the downhole connector sub. When the tension is released from the wire line the outer operating member will be moved downwardly by the wight of the sinker bars and the cam pin 71 will travel down the ramp surface 125 and come to rest in the depression 126. This movement of the cam pin in the cam slot will, of course, cause the cam to rotate and upon reapplication of tension to the wireline the cam pin will travel up the ramp surface 127 until it engages the slot 128 and travels up the slot. The peak 124 or end of the slot 128 is positioned to provide the outer operating member with sufficient axial movement to force the ramp surface 73 into contact with the ramp 74 and cause the fingers 75 to engage the companion connector on the downhole connector sub and firmly lock the connector to the downhole sub. From the above brief description of the profile of the cam slot 72, it is seen that the sequential application and release of tension on the wireline will cause the cam to rotate so that the movement of the outer operating member is limited to either a position where the connector can be removed from the downhole sub or to a position to where it can be locked firmly on the downhole sub. Vent ports 76 are formed in the body of the connector to vent the interior of the connector and equalize pressures. A more complete description and illustration of the locking and release mechanism of the tool is shown in Taylor Made's literature available as an instruction manual for said tool.

As can be seen in the brief explanation above, the downhole connector can be lowered into the well until the collet fingers are positioned over the fishing neck 44 of the downhole connector, and the female connector 67 has engaged the male connector 40. The wireline can then be pulled upward to both tension the wireline and move the connector into a locking position. When it is desired to release the downhole connector, the tension can be removed from the wireline and allow the overshoot tool to release the collet fingers, and then the connector can be withdrawn from the well. This permits connecting and disconnecting the tool without applying tension to the tool. Thus, the possibility of the downhole connector rebounding in the drill string due to the sudden release of the tension on the wireline is eliminated. The sudden rebouding of the downhole connector can cause the wireline to become tangled in the drill pipe and prevent its removal. Referring to FIG. 6, there is shown an alternate downhole connector. The connector is a modified wireline overshot manufactured by Otis Engineering Corporation of Dallas, Tex. The basic tool 13 is provided with an upper connector 110, which mates with male connector 111. The connector 111 mates with the connector on the first sinker bar that threads into the threaded end 112 of the tool. A similar connector 113 is mounted in the lower end of the tool and mates with the connector 40 on the connector sub, shown in FIG. 3. The two connectors 110 and 113 may be connected together by a flexible electrical cable through passageway 114.

The overshot tool has a plurality of fingers 100 that engage a flange 101 formed on the fishing neck 44 of the connector sub. The fingers are forced into engagement with the flange by a tapered surface 102 at lower end of a cylindrical outer member 103. The tapered surfaces force the fingers in when the cylindrical outer member 103 is moved relative to the fingers. The fingers 100 are disposed in longitudinal slots formed in the outer member 103. The fingers 100 pivot on the ring-shaped portion 108 of the outer member 103.

The overshot is released by applying sufficient tension to the wireline to fracture the shear pin 104. To insure uniform operation, the shear pin is provided with fracture grooves 105 at each end. When the shear pin fractures, the spring 106 will move the cylindrical member 103 downwardly relative to the fingers 100. Normally, the wireline tension will have to be removed to disengage the fingers. The edge 107 of the cylindrical member will pivot the upper end of the fingers in, and release the lower end of the fingers from the fishing neck. After the fingers are released, the wireline can be withdrawn from the drill string. The downhole connector can then be recocked and a new shear pin inserted. By proper choice of shear pin size, the downhole connector can be made to operate at a tension less than the ultimate strength of the wireline but greater than the normal tension on the wireline.

Many modifications can be made in the telemetering system of the present invention. For example, a series of wirelines may be installed in the drill string. When a series of wirelines are used, the lowest one should have the greatest tension, and the tension should be lowered in each additional wireline. This insures that the upper wirelines may be removed first, followed by the removal of the other wirelines in a descending order. The use of a series of individual wirelines is particularly desirable in deep boreholes. When a series of wirelines are used, each individual wireline is supported. This distributes the load of the wireline to a series of anchor points.

Further improvements can be made by combining the downhole connector sub and instrument sub in a single member. This would allow direct connection of the wireline to the instrument sub.

While the invention is described in combination with the special drill pipe of U.S. Pat. No. 3,696,332, other methods may be used to complete the electrical circuit. For example, U.S. Pat. Nos. 2,354,887 and 2,411,696 disclose a telemetering system using electro-magnetic currents induced in the circuit formed by the drill string and the earth. This type of system has a limited range but when used in combination with the wireline system of this invention as shown in FIG. 7, and a suitable transmitter disposed in the upper connector sub, forms a useful system.

I claim as my invention:

1. A method for drilling a borehole and telemetering information from the bottom of the borehole to the surface while drilling, said method comprising:

extending a portion of the drill string into the borehole including an instrument sub located adjacent the lower end of the drill string, said portion being less than the total length of the drill string required to drill the borehole;

lowering a wireline through said drill string and applying tension to latch the lower end of the wireline to the instrument sub located in the lower end of the drill string;

maintaiing the tension on the wireline while anchoring the upper end of the wireline adjacent the top of the drill string extending into said borehole;

extending additional special drill string into the borehole, each section of said special drill string containing an electrical conductor that terminates at each end of the section in an electrical connector that mates with a similar connector on the adjacent section of the special drill string;

connecting the upper end of the wireline to the connector on the adjacent section of the special drill string to complete an electrical circuit from the lower end of the drill string to the surface;

telemetering information over the electrical circuit while drilling the borehole;

removing said special drill string from the borehole after the drilling is completed; and releasing the tension on the wireline to unlatch the lower end of the wireline from the instrument sub and removing said wireline.

2. The method of claim 1, and in addition, replacing said additional special drill string with an additional conventional drill string after said borehole is drilled to a preset depth and completing the electrical circuit through said additional conventional drill pipe by:

lowering a second wireline into said additional conventional drill string;

tensioning said second wireline and anchoring the top of the second wireline adjacent the top of said additional conventional drill string; and electrically coupling said second wireline to said first-mentioned wireline and continuing to drill said borehole using said special drill string while electrically coupling said second wireline to said special drill string.

3. The method of claim 2 wherein said special drill string is replaced at preset depth intervals and replaced with a conventional drill string, and a tensioned and anchored wireline combination.

4. The method of claim 2 wherein each succeeding wireline is tensioned to a lower level than the previously installed wireline.

5. An apparatus for telemetering information from an instrument package in an instrument sub adjacent the bottom of a borehole while drilling the borehole, using a rotating drill string having a drill bit at its lower end, said apparatus comprising:

an instrument package mounted in an instrument sub, said sub forming part of the drill string and positioned adjacent said drill bit;

a wireline containing at least one electrical conductor, said wireline extending through the interior of said drill string;

a releasable downhole electrical connector, said downhole electrical connector being connected to the conductor in said wireline, and adapted to engage and latch both electrically and physically with a mating connector on said instrument package when tension is applied to said wireline and release from said mating connector when tension is subsequently removed from said wireline;

an anchoring means, said anchoring means being fixably disposed in said drill string, the upper end of said wireline being removably secured to said anchoring means;

at least one section of said drill string having an insulated electrical conductor extending through the section of said drill string, and connecting at each end of the section of said drill string to electrical connectors disposed in the sealing shoulders of each end of the section of said drill string; and means for connecting the conductor in said wireline to the connector in one of the sealing shoulders of at least said one section of the said drill string.

6. The apparatus of claim 5 and in addition, said mating connector being disposed in a separate sub member adapted to be included as a section of the drill string, said separate sub member having an electrical connector disposed in one of its sealing shoulders, said electrical connector being disposed to contact a similar connector disposed in the sealing shoulder of said instrument sub.

7. The apparatus of claim 5, and in addition, at least one spacer member disposed between the upper end of the wireline, and said anchoring means to adjust the length of said wireline.

8. An apparatus for releasably anchoring the upper end of an armored cable in a drill string comprising:

a sub member adapted to be assembled as a part of said drill string;

a cylindrical support member mounted coaxially in said sub;

a cable connector and terminal member adapted to receive a terminal secured to said upper end of the cable;

a plurality of finger members pivotably mounted on the upper end of said cable connector and terminal member; and biasing means mounted on said cable connector and terminal member and disposed to bias said finger members toward a retracted position that permits said cable connector and terminal member to pass through said cylindrical support member, said fingers being movable to an extended position where they engage the upper end of said cylindrical member and prevent said cable connector terminal member from passing downwardly through said cylindrical support member.

9. The apparatus of claim 8, and in addition, said sub member being provided with an electrical contact ring in its upper sealing shoulder for forming an electrical connection with a mating contact ring disposed in the sealing shoulder of the drill pipe above said sub member.

10. The apparatus of claim 9, and in addition, a central passageway formed in said cable connector and terminal member, an electrical conductor disposed partly in and partly out of said passageway and connected to the terminal secured to the upper end of said armored cable at one end and said electrical contact ring disposed in the sealing shoulder of said separate sub at the other end.

11. The apparatus of claim 8, and in addition, at lease one spacer member disposed between the upper end of the armored cable, and said cable connector and terminal member to adjust the length of said wireline.

12. The apparatus of claim 8, and in addition, a fishing neck formed on the upper end of said cable connector and terminal member.

13. The apparatus of claim 10 wherein said electrical conductor comprises a first electrical wire connecting the terminal on the upper end of the armored cable to a plug-in connector disposed on the upper end of the cable connector and terminal member and a second electrical wire having plug-in connectors at each end and adapted to connect the plug-in connector on the upper end of the cable connector and terminal member to a similar plug-in connector disposed on said sub member.

14. The apparatus of claim 13, and in addition, a passageway formed in said sub member, an electrical wire disposed in the passageway in said sub member and connected to the plug-in connector on said sub member at one end and said contact ring at the other end.

15. A method for drilling a borehole and telemetering information from the bottom of the borehole to the surface while drilling, said method comprising:

extending a portion of the drill string into the borehole, said portion being less than the total length of the drill string required to drill the borehole;

lowering a wireline into said drill string and applying tension to latch the lower end of the wireline to an instrument package located adjacent the lower end of the drill string;

retaining the tension on the wireline while anchoring the upper end of the wireline adjacent the top of the drill string extending into said borehole;

extending additional drill string into the borehole, said additional drill string including an electro-magnetic transducer; and connecting the upper end of the wireline to the electro-magnetic transducer to complete the telemetry circuit to the top of the borehole.

* * * * *